United States Patent
Iwaya et al.

(10) Patent No.: US 8,568,931 B2
(45) Date of Patent: Oct. 29, 2013

(54) NON-AQUEOUS ELECTROLYTE SOLUTION FOR SECONDARY BATTERIES

(75) Inventors: Masao Iwaya, Tokyo (JP); Ryuji Seki, Tokyo (JP); Shouji Furuta, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/421,229

(22) Filed: Mar. 15, 2012

(65) Prior Publication Data

US 2012/0171580 A1 Jul. 5, 2012

Related U.S. Application Data

(63) Continuation of application No. PCT/JP2010/066089, filed on Sep. 16, 2010.

(30) Foreign Application Priority Data

Sep. 18, 2009 (JP) .................................. 2009-217943

(51) Int. Cl.
*H01M 6/18* (2006.01)
(52) U.S. Cl.
USPC ........... 429/323; 429/322; 429/338; 429/342; 252/62.2
(58) Field of Classification Search
USPC .................. 429/323, 322, 338, 342; 252/62.2
See application file for complete search history.

(56) References Cited

U.S. PATENT DOCUMENTS

2010/0015514 A1  1/2010 Miyagi

FOREIGN PATENT DOCUMENTS

| JP | 2000-260400 | * | 9/2000 |
|---|---|---|---|
| JP | 2000-315522 | | 11/2000 |
| JP | 2007-214120 | | 8/2007 |
| JP | 2007-220670 | | 8/2007 |
| JP | 2007-257958 | | 10/2007 |

OTHER PUBLICATIONS

International Search Report issued Oct. 19, 2010 in PCT/JP2010/066089, filed Sep. 16, 2010.

* cited by examiner

*Primary Examiner* — Laura Weiner
(74) *Attorney, Agent, or Firm* — Oblon, Spivak, McClelland, Maier & Neustadt, L.L.P.

(57) ABSTRACT

To provide a non-aqueous electrolyte solution for secondary batteries, by which a secondary battery having both high conductivity and stability free from thermal runaway may be obtained. A non-aqueous electrolyte solution for secondary batteries, which comprises a lithium salt (a1) represented by $R^1$—CHF—$SO_2$—N(Li)—$SO_2$—CHF—$R^2$ wherein in the formula (a1), each of $R^1$ and $R^2$ which are independent of each other, is a fluorinated $C_{1-5}$ alkyl group which may contain an ethereal oxygen atom, or a fluorine atom, an inorganic lithium salt (a2), and a solvent, wherein the proportion of the lithium salt (a1) based on the total amount i.e. 100 mol % of the lithium salt (a1) and the inorganic lithium salt (a2) is from 5.0 to 20.0 mol %.

6 Claims, 1 Drawing Sheet

NON-AQUEOUS ELECTROLYTE SOLUTION FOR SECONDARY BATTERIES

CROSS REFERENCE TO RELATED APPLICATION

This application is a continuation of PCT/JP2010/066089, filed on Sep. 16, 2010, and claims priority to Japanese Patent Application No. 2009-217943, filed on Sep. 18, 2009.

TECHNICAL FIELD

The present invention relates to a non-aqueous electrolyte solution for secondary batteries.

BACKGROUND ART

As a non-aqueous electrolyte solution for secondary batteries such as lithium secondary batteries and lithium-ion secondary batteries, a non-aqueous electrolyte solution (1) containing an inorganic lithium salt such as $LiPF_6$ or $LiBF_4$ is used because of its high conductivity and excellent withstand voltage properties.

Further, as an electrolyte salt, a non-aqueous electrolyte solution (2) wherein a bis-(sulfonyl)imide lithium salt such as $Li[N(SO_2-CFH-CF_3)_2]$ or $Li[N(SO_2-CH_2-CF_3)_2]$ is used as the main component (at least 60 mol % based on 100 mol % of the total electrolyte salts) is also known (Patent Document 1).

PRIOR ART DOCUMENTS

Patent Document

Patent Document 1: JP 2000-260400 A

DISCLOSURE OF INVENTION

Technical Problem

However, although the non-aqueous electrolyte solution (1) provides high conductivity, when it is used for a secondary battery, heat may be drastically generated in the vicinity of the positive electrode in the electrolyte solution, which may lead to thermal runaway. And, the non-aqueous electrolyte solution (2) does not provide sufficient conductivity, and thus it has a problem of practicality.

The object of the present invention is to provide a non-aqueous electrolyte solution for secondary batteries, by which a secondary battery having both high conductivity and stability free from thermal runaway may be obtained, and a secondary battery having such a non-aqueous electrolyte solution.

Solution to Problem

The present inventors have found that a specific bis-(sulfonyl)imide salt has an effect to suppress thermal runaway, and have accomplished the present invention. That is, in order to solve the above problem, the present invention provides the following.

[1] A non-aqueous electrolyte solution for secondary batteries, which comprises a lithium salt (a1) represented by the formula (a1), a lithium salt (a2) which is an inorganic lithium salt, and a solvent, wherein the proportion of the lithium salt (a1) based on the total amount of the lithium salt (a1) and the lithium salt (a2) is from 5.0 to 20.0 mol %:

$$R^1-CHF-SO_2-N(Li)-SO_2-CHF-R^2 \qquad (a1)$$

wherein in the formula (a1), each of $R^1$ and $R^2$ which are independent of each other, is a fluorinated $C_{1-5}$ alkyl group which may contain an ethereal oxygen atom, or a fluorine atom.

[2] The non-aqueous electrolyte solution for secondary batteries according to the above [1], wherein the lithium salt (a1) is a compound represented by the formula (a1-1):

$$CF_3-CHF-SO_2-N(Li)-SO_2-CHF-CF_3 \qquad (a1-1).$$

[3] The non-aqueous electrolyte solution for secondary batteries according to the above [1] or [2], wherein the lithium salt (a2) is $LiPF_6$, $LiBF_4$ or $LiClO_4$.

[4] The non-aqueous electrolyte solution for secondary batteries according to the above [1] or [2], which contains at least one member selected from the group consisting of $LiPF_6$, $LiBF_4$ or $LiClO_4$.

[5] The non-aqueous electrolyte solution for secondary batteries according to the above [1] or [2], which contains $LiPF_6$.

[6] The non-aqueous electrolyte solution for secondary batteries according to any one of the above [1] to [5], which contains a carbonate type solvent.

[7] The non-aqueous electrolyte solution for secondary batteries according to any one of the above [1] to [6], wherein the total amount of the lithium salt (a1) and the lithium salt (a2) in the non-aqueous electrolyte solution is from 0.5 to 3.0 mol per 1 L of the whole solvent.

[8] The non-aqueous electrolyte solution for secondary batteries according to any one of the above [1] to [7], which is a non-aqueous electrolyte solution for lithium-ion secondary batteries.

[9] A lithium-ion secondary battery which has a positive electrode containing a positive electrode active material capable of absorbing/desorbing lithium ions, a negative electrode containing a negative electrode active material capable of absorbing/desorbing lithium metal, a lithium alloy or lithium ions, and the non-aqueous electrolyte solution for secondary batteries as defined in any one of the above [1] to [8].

Advantageous Effects of Invention

By using the non-aqueous electrolyte solution for secondary batteries of the present invention, a secondary battery having both high conductivity and stability free from thermal runaway may be obtained.

DESCRIPTION OF EMBODIMENTS

<Non-Aqueous Electrolyte Solution for Secondary Batteries>

The non-aqueous electrolyte solution for secondary batteries of the present invention (hereinafter referred to simply as "the non-aqueous electrolyte solution") is a non-aqueous electrolyte solution containing a lithium salt as an electrolyte salt.

[Lithium Salt]

The non-aqueous electrolyte solution of the present invention comprises a lithium salt (a1) represented by the following formula (a1), an inorganic lithium salt (a2) and a solvent. These lithium salts dissociate in the non-aqueous electrolyte solution of the present invention to supply lithium ions:

wherein in the formula (a1), each of $R^1$ and $R^2$ which are independent of each other, is a fluorinated $C_{1-5}$ alkyl group which may contain an ethereal oxygen atom (hereinafter referred to as "fluorinated alkyl group (α)"), or a fluorine atom.

Hereinafter, a lithium salt represented by the formula (a1) will be referred to as a lithium salt (a1). Further, the same applies to lithium salts represented by formulae other than the formula (a1).

The lithium salt (a1) is a bis-(sulfonyl)imide lithium salt wherein each carbon atom linked to the sulfur atom has a structure of —CHF—, and the group linked to the carbon atom at the opposite side of the sulfur atom is a fluoroalkyl group having a part or all of the hydrogen atoms substituted by fluorine atoms, which may contain an ethereal oxygen atom, or a fluorine atom.

$R^1$ in the lithium salt (a1) is a fluorinated alkyl group (α) or a fluorine atom, preferably a fluorinated alkyl group (α).

In a case where $R^1$ is a fluorinated alkyl group (α), the number of carbon atoms is from 1 to 5. When the number of carbon atoms of the fluorinated alkyl group (α) of $R^1$ is from 1 to 5, influence on the properties such as conductivity is small even when the lithium salt (a1) is added at a concentration sufficient to exhibit an effect to suppress decomposition/heat generation of the electrolyte solution on a positive electrode at the time of excessive heat of the battery. The number of carbon atoms of the fluorinated alkyl group (α) of $R^1$ is preferably from 1 to 3, particularly preferably 1, from the viewpoint that high conductivity may easily be maintained.

Further, in the case where $R^1$ is a fluorinated alkyl group (α), the fluorinated alkyl group (α) is preferably such that all of the hydrogen atoms of the alkyl group are substituted by fluorine atoms, from the viewpoint of the superior effect to suppress thermal runaway.

$R^2$ is the same fluorinated alkyl group (α) or fluorine atom as the above $R^1$, and the preferred structure is also the same.

$R^1$ and $R^2$ may be the same or different.

The lithium salt (a1) is particularly preferably the following lithium salt (a1-1), with a view to having both stability free from thermal runaway and high conductivity:

The inorganic lithium salt (a2) is an electrolyte salt as the main component of the non-aqueous electrolyte solution of the present invention, and is an inorganic lithium salt which dissociates in the non-aqueous electrolyte solution to supply lithium ions.

The lithium salt (a2), which is an inorganic lithium salt, may, for example, be $LiPF_6$, $LiBF_4$, $LiClO_4$, $LiAsF_6$, $LiB$ $(C_6H_5)_4$ or $CH_3SO_3Li$. The lithium salt (a2) is preferably $LiPF_6$, $LiBF_4$ or $LiClO_4$. Such a lithium salt is a compound known as a lithium salt for lithium-ion secondary batteries.

The non-aqueous electrolyte solution of the present invention preferably contains, as the lithium salt (a2), at least one lithium salt selected from the group consisting of $LiPF_6$, $LiBF_4$ and $LiClO_4$, more preferably $LiPF_6$, from the viewpoint that an electrolyte solution having high conductivity may easily be obtained. Further, the non-aqueous electrolyte solution of the present invention preferably contains only one member selected from the group consisting of $LiPF_6$, $LiBF_4$ and $LiClO_4$, particularly preferably only $LiPF_6$, as the lithium salt (a2).

In the non-aqueous electrolyte solution of the present invention, the proportion of the lithium salt (a1) based on the total amount of the lithium salt (a1) and the lithium salt (a2) is from 5.0 to 20.0 mol %. Such a proportion is preferably from 5.0 to 15.0 mol %, more preferably from 5.0 to 10.0 mol %. As the proportion of the lithium salt (a1) is higher, thermal runaway of a secondary battery having the non-aqueous electrolyte solution of the present invention is more likely to be suppressed, and a secondary battery excellent in stability may thereby be obtained. As the proportion of the lithium salt (a1) is lower, higher conductivity may be obtained. When the proportion of the lithium salt (a1) is from 5.0 to 20.0 mol %, the effect to suppress thermal runaway may be obtained while a practical conductivity is secured.

The total amount of the lithium salt (a1) and the lithium salt (a2) in the non-aqueous electrolyte solution is preferably from 0.5 to 3.0 mol, more preferably from 0.5 to 2.0 mol, per 1 liter of the whole solvent. As the total amount of the lithium salt (a1) and the lithium salt (a2) is larger, a non-aqueous electrolyte solution having both high conductivity and excellent stability may more easily be obtained. As the total amount of the lithium salt (a1) and the lithium salt (a2) is smaller, such lithium salts may more easily be dissolved in a solvent.

Further, as the case requires, the non-aqueous electrolyte solution may contain a lithium salt (a3) other than the lithium salt (a1) or the inorganic lithium salt (a2). In the case where the non-aqueous electrolyte solution of the present invention contains the lithium salt (a3), the content of the lithium salt (a3) is preferably from 5 to 40 mol % based on the total lithium salts contained in the non-aqueous electrolyte solution.

As described above, the non-aqueous electrolyte solution of the present invention contains a small amount of the lithium salt (a1), whereby an effect to suppress thermal runaway in the vicinity of a positive electrode may be obtained when it is used for a secondary battery. Hereinafter, such an effect will be described in detail.

Heretofore, there has been a problem such that when a secondary battery using an inorganic lithium salt such as $LiPF_6$, like the above non-aqueous electrolyte solution (1), is excessively charged, if, for example, a solvent such as a carbonate type solvent is oxidized and decomposed at the positive electrode, heat may be drastically generated to lead to thermal runaway.

In this regard, the present inventors have found that the lithium salt (a1) may be used as a lithium salt as a electrolyte salt to suppress such thermal runaway. With regard to a secondary battery having the non-aqueous electrolyte solution of the present invention, bis-(sulfonyl)imide anions generated by dissociation of the lithium salt (a1) contained in the electrolyte solution form a protective membrane on the positive electrode. By such a protective membrane, contact between a solvent such as a carbonate type solvent and the positive electrode is prevented, and oxidation of such a solvent on the positive electrode is suppressed, whereby it is possible to suppress thermal runaway of the secondary battery.

Further, the present inventors have also found that the effect to suppress thermal runaway by the protective membrane is attained by a small amount of the lithium salt (a1). Therefore, for the non-aqueous electrolyte solution of the present invention, it is possible to use, as the main component, a lithium salt having high conductivity such as $LiPF_6$, and thus high conductivity may also be obtained.

Further, the lithium salt (a1) also has an effect as described below.

Particularly when graphite is used as a negative electrode for a secondary battery, a bis-(sulfonyl)imide lithium salt having a perfluoroalkyl group (hereinafter referred to as "lithium salt (b1)") such as $Li[N(SO_2C_2F_5)_2]$ and a lithium salt (b2) having the following cyclic structure (wherein k is an integer of from 1 to 5) are likely to be reduced and decomposed on the negative electrode. In contrast, the lithium salt (a1) of the non-aqueous electrolyte solution of the present invention is excellent in reduction resistance as compared with the lithium salt (b1) and the lithium salt (b2) because a hydrogen atom is linked to each carbon atom linked to the sulfur atom, of the fluorinated alkyl group. Thus, even when a negative electrode using graphite is used, the lithium salt (a1) is less likely to be reduced and decomposed, and the effect to suppress thermal runaway may be stably exhibited. Therefore, it is particularly preferred that the non-aqueous electrolyte solution of the present invention is applied to a secondary battery having a negative electrode using graphite.

(b2)

[Solvent]

The non-aqueous electrolyte solution of the present invention is an electrolyte solution comprising a solvent containing substantially no water, and the above lithium salts. That is, even if the solvent in the non-aqueous electrolyte solution of the present invention contains water, the amount of water is at a level where performance degradation of a secondary battery using the non-aqueous electrolyte solution of the present invention is not observed.

The amount of water contained in the non-aqueous electrolyte solution of the present invention is preferably from 0 to 500 wt ppm, more preferably from 0 to 100 wt ppm, particularly preferably from 0 to 50 wt ppm, based on the total weight of the electrolyte solution.

The solvent of the non-aqueous electrolyte solution of the present invention is preferably a carbonate type solvent, a hydrofluoroether or an ether compound containing no fluorine atom.

Hereinafter, in the description of the solvent, a compound represented by the formula (2) will be referred to as a compound (2), and the same applies to the compounds represented by other numbers.

(Carbonate Type Solvent)

The carbonate type solvent may, for example, be a cyclic carbonate or a chain carbonate. As the carbonate type solvent, only one of either cyclic carbonates or chain carbonates may be used, or a mixture of two or more of one or both of cyclic carbonates and chain carbonates may be used. By the carbonate type solvent, the solubility of the lithium salt may be improved, and high conductivity may be obtained.

The cyclic carbonate means 1,3-dioxolan-2-one, a 1,3-dioxolan-2-one derivative, 1,3-dioxol-2-one or a 1,3-dioxol-2-one derivative. The derivative means a compound having a halogen atom, an alkyl group or a haloalkyl group in the 4 position or in the 5 position, or both in the 4 position and in the 5 position. When the compound has such an atom or a group both in the 4 position and in the 5 position, they may be the same or different. The halogen atom is preferably a chlorine atom or a fluorine atom, the alkyl group is preferably an alkyl group having at most 4 carbon atoms, and the haloalkyl group is preferably a haloalkyl group having at most 4 carbon atoms and having at least one chlorine atom or fluorine atom.

The chain carbonate means a dialkyl carbonate or a dialkyl carbonate derivative. The two alkyl groups of the dialkyl carbonate may be the same or different, and they each preferably have at most 6 carbon atoms. The dialkyl derivative means one having at least one of the two alkyl groups substituted by a haloalkyl group having at most 6 carbon atoms and having at least one chlorine atom or fluorine atom. Each of the alkyl group(s) and the haloalkyl group(s) preferably has at most 4 carbon atoms, further preferably 1 or 2 carbon atoms.

The cyclic carbonate is preferably at least one compound selected from the group consisting of propylene carbonate, ethylene carbonate, butylene carbonate, 4-chloro-1,3-dioxolan-2-one, 4-trifluoromethyl-1,3-dioxolan-2-one, fluoroethylene carbonate, vinylene carbonate and dimethylvinylene carbonate, and from the viewpoint of the availability, the solubility of the lithium salt and the conductivity, it is particularly preferably ethylene carbonate, propylene carbonate, fluoroethylene carbonate or vinylene carbonate.

The chain carbonate is preferably at least one compound selected from the group consisting of dimethyl carbonate, diethyl carbonate, methyl ethyl carbonate, di-n-propyl carbonate, methyl-n-propyl carbonate, ethyl-n-propyl carbonate, methyl isopropyl carbonate, ethyl isopropyl carbonate, diisopropyl carbonate and 3-fluoropropyl methyl carbonate, and from the viewpoint of the availability, the solubility of the lithium salt and the conductivity, it is particularly preferably dimethyl carbonate, diethyl carbonate or methyl ethyl carbonate.

Further, as the carbonate type solvent, a carbonate type solvent having a function as a property-improving additive as described hereinafter, may be used. As the carbonate type solvent having such a function, for example, fluoroethylene carbonate, trifluoropropylene carbonate, phenylethylene carbonate, erythritan carbonate or spiro-bis-dimethylene carbonate may be mentioned. Such a carbonate type solvent having a function as a property-improving additive is preferably used in combination with another carbonate type solvent.

As the carbonate type solvent, a cyclic carbonate is preferred. When charging is carried out with a secondary battery having a non-aqueous electrolyte solution of the present invention containing a cyclic carbonate, the cyclic carbonate is decomposed on the surface of the negative electrode (e.g. a carbon electrode) to form a stable coating film. The coating film formed by the cyclic carbonate is capable of reducing the resistance at the electrode interface, whereby intercalation of lithium ions to the negative electrode is promoted. That is, the impedance at the negative electrode interface is made small by the coating film formed by the cyclic carbonate in the non-aqueous electrolyte solution of the present invention, whereby intercalation of lithium ions to the negative electrode is promoted.

Further, as the carbonate type solvent, it is also preferred to use a chain carbonate and a cyclic carbonate in combination. When a cyclic carbonate and a chain carbonate are used in combination as the carbonate type solvent, a solution state of high lithium salt concentration may easily be maintained even at low temperature.

In the case where a chain carbonate and a cyclic carbonate are used in combination as the carbonate type solvent, the volume ratio ($V_1:V_2$) of the chain carbonate (volume: $V_1$) to the cyclic carbonate (volume: $V_2$) is preferably from 1:10 to 10:1.

When the content of the cyclic carbonate is within such a range, the melting point of the mixed solvent will be within an appropriate range, and the electrolyte solution having the lithium salt dissolved will become stable. On the other hand, the content of the chain carbonate is within such a range, the solubility of the lithium salt will be within an appropriate range, and the electrolyte solution having the lithium salt dissolved will become stable.

The amount of the carbonate type solvent in the non-aqueous electrolyte solution of the present invention is not particularly limited, and it may suitably be changed depending upon the type of the solvent to be used in combination. When the amount of the carbonate type solvent is from 0 to 40 vol %, based on 100 vol % of the total solvents to be used for the non-aqueous electrolyte solution, a highly stable electrolyte solution may easily be obtained without a problem of gas generation. When it is from 40 to 100 vol %, an electrolyte solution excellent in solubility of the lithium salts and conductivity may easily be obtained.

(Hydrofluoroether)

The hydrofluoroether is a solvent which imparts nonflammability to an electrolyte solution, and has a structure wherein some of hydrogen atoms of an ether are substituted by fluorine atoms.

The hydrofluoroether may, for example, be the following compound (2):

wherein each of $R^3$ and $R^4$ of the compound (2), which are independent of each other, is $C_{1-10}$ fluorinated alkyl group or a $C_{1-10}$ fluorinated alkyl group having an ethereal oxygen atom between carbon-carbon atoms, provided that at least one of $R^3$ and $R^4$ is a partially fluorinated group, and $R^3$ and $R^4$ may be the same or different.

The fluorinated alkyl group is a group wherein some or all of hydrogen atoms of the alkyl group are substituted by fluorine atoms. The partially fluorinated group is a group wherein some of hydrogen atoms of an alkyl group which may have an ethereal oxygen atom between carbon-carbon atoms are substituted by fluorine atoms. In the partially fluorinated group, a hydrogen atoms is present. Further, the structure of the alkyl group in each of the fluorinated alkyl group and the fluorinated alkyl group having an ethereal oxygen atom between carbon-carbon atoms may, for example, be a straight chain structure, a branched structure, a cyclic structure or a group having a partially cyclic structure (such as a cycloalkyl alkyl group).

The compound (2) is preferably a compound (2-A) wherein each of $R^3$ and $R^4$ is a partially fluorinated $C_{1-10}$ alkyl group, or a compound (2-B) wherein $R^3$ is a partially fluorinated $C_{1-10}$ alkyl group having an ethereal oxygen atom between carbon-carbon atoms, and $R^4$ is a partially fluorinated $C_{1-10}$ alkyl group or a partially fluorinated $C_{1-10}$ alkyl group having an ethereal oxygen atom between carbon-carbon atoms.

With the compound (2), if the number of carbon atoms is too small, the boiling point tends to be too low, and if it is too large, the viscosity tends to be high. Accordingly, the compound having a total number of carbon atoms being from 4 to 10 is preferred, and the compound having a total number of carbon atoms being from 4 to 8, is particularly preferred. The molecular weight of the compound (2) is preferably from 200 to 800, more preferably from 200 to 500, particularly preferably from 200 to 500. The number of ethereal oxygen atoms in the compound (2) is influential over the flammability. Therefore, in the case of a compound (2) having ethereal oxygen atoms, the number of ethereal oxygen atoms is preferably from 1 to 4, particularly preferably 1 or 2. Further, as the fluorine content in the compound (2) becomes high, the nonflammability will be improved, and the proportion of the total atomic weight of fluorine atoms to the molecular weight of the compound (2) is preferably at least 50%, particularly preferably at least 60%.

The compound (2) is preferably the compound (2-A), preferably $CF_3CH_2OCF_2CF_2H$ (tradename: AE-3000, manufactured by Asahi Glass Company, Limited), $CHF_2CF_2CH_2OCF_2CF_2H$ or $CF_3CH_2OCF_2CHFCF_3$, particularly preferably $CF_3CH_2OCF_2CF_2H$.

Further, as a hydrofluoroether other than the compound (2), the following compound (3) may, for example, be mentioned:

wherein in the compound (3), $X_A$ is any one of a $C_{1-5}$ alkylene group, a partially fluorinated $C_{1-5}$ alkylene group, a $C_{1-5}$ alkylene group having an ethereal oxygen atom between carbon-carbon atoms and a partially fluorinated $C_{1-5}$ alkylene group having an ethereal oxygen atom between carbon-carbon atoms. A partially fluorinated alkylene group is a group wherein some of hydrogen atoms of an alkylene group are substituted by fluorine atoms.

From the viewpoint that the lithium salt can be uniformly dissolved and an electrolyte solution having excellent nonflammability and high conductivity may easily be obtained, the compound (3) is preferably a hydrofluoroether wherein $X_A$ in the formula (3) is one member selected from the group consisting of $CH_2$, $CH_2CH_2$, $CH(CH_3)CH_2$ and $CH_2CH_2CH_2$.

The hydrofluoroether is preferably at least one member selected from the group consisting of the compound (2) and the compound (3).

The content of the hydrofluoroether in the non-aqueous electrolyte solution of the present invention is not particularly limited, and it may suitably be changed depending upon the type of the solvent to be used in combination. When the content of the hydrofluoroether is from 0 to 40 vol % based on the total solvent amount i.e. 100 vol % to be used for the non-aqueous electrolyte solution, an electrolyte solution excellent in solubility of the lithium salt and conductivity may easily be obtained, and when it is from 40 to 100 vol %, a highly stable electrolyte solution may easily be obtained without a problem of gas generation.

Further, in a case where as the hydrofluoroether, the compound (2) (volume: Va) and the compound (3) (volume: Vb) are used in combination, the volume ratio (Vb/Va) is preferably from 0.01 to 0.99, more preferably from 0.1 to 0.9.

(Ether Compound)

The ether compound is an ether compound containing no fluorine atom. Such an ether compound may, for example, be the following compound (4):

$$R^5-O-(Q-O)_m-R^6 \quad (4)$$

wherein in the compound (4), m is an integer of from 1 to 10, Q is a linear $C_{1-4}$ alkylene group or such a linear alkylene group having at least one hydrogen atom substituted by a $C_{1-5}$ alkyl group or a $C_{1-5}$ alkyl group containing an ethereal oxygen atom between carbon-carbon atoms, provided that when m is 2 or more, plural Q may be the same groups or different groups, and each of $R^5$ and $R^6$ which are independent of each other, is a $C_{1-5}$ alkyl group, or $R^5$ and $R^6$ are linked to each other to form a $C_{1-10}$ alkylene group.

m in the compound (4) is preferably from 1 to 6, more preferably from 2 to 5, particularly preferably from 2 to 4.

Q is particularly preferably —$CH_2CH_2$—.

Each of $R^5$ and $R^6$ is preferably a methyl group or an ethyl group, particularly preferably a methyl group.

The compound (4) is preferably the following compound (4A):

wherein in the compound (4A), m, $R^5$ and $R^6$ are the same as above.

The compound (4A) is preferably monoglyme, diglyme, triglyme, tetraglyme, pentaglyme, hexaglyme, diethylene glycol diethyl ether, triethylene glycol diethyl ether, tetraethylene glycol diethyl ether, pentaethylene glycol diethyl ether or hexaethylene glycol diethyl ether, more preferably monoglyme, diglyme, triglyme, tetraglyme, pentaglyme or hexaglyme.

Further, the compound (4A) wherein $R^5$ and $R^6$ are linked to each other to form a $C_{1-10}$ alkylene group, may, for example, be 12-crown-4, 14-crown-4, 15-crown-5 or 18-crown-6.

One of such compounds (4) may be used alone, or two or more of them may be used in combination.

The content of the compound (4) in the non-aqueous electrolyte solution of the present invention is preferably from 0 to 30 vol %, more preferably from 0 to 20 vol %, based on 100 vol % of the total solvents to be used for the non-aqueous electrolyte solution.

As the content of the compound (4) becomes larger, the solubility of the lithium salt will be more improved. As the amount of the compound (4) becomes smaller, it becomes easier to obtain a non-aqueous electrolyte solution excellent in cycle characteristics.

(Other Solvents)

Further, the solvent of the non-aqueous electrolyte solution of the present invention may contain a solvent other than the above carbonate type solvent, hydrofluoroether and ether compound, i.e. such as an ester type solvent. The ester type solvent is a solvent which is a chain ester or a cyclic ester of an acid such as a carboxylic acid, a sulfonic acid, phosphoric acid or nitric acid. The number of carbon atoms of the ester type solvent is preferably from 3 to 12, more preferably from 4 to 8. If the number of carbon atoms of the ester type solvent is smaller than the above, the boiling point tends to be too low, and a secondary battery becomes likely to be expanded by the vapor pressure even under normal use condition of secondary batteries. Further, if the number of carbon atoms of the ester type solvent is larger than the above, the viscosity tends to be high, and the conductivity of the electrolyte solution and low-temperature characteristics may be declined.

The ester type solvent may, for example, be a carboxylic acid ester such as an alkyl propionate, a dialkyl malonate or an alkyl acetate, a cyclic ester such as γ-butyrolactone, a cyclic sulfonic acid ester such as 1,3-propanesultone or 1,4-butansultone, an alkyl sulfonate such as methyl methanesulfonate, or an alkyl phosphate.

Such ester type solvents include one having a function as a property-improving additive as described hereinafter, such as a cyclic sulfonic acid or an alkyl sulfonate, and such an ester type solvent may be contained as a solvent, as well as for the purpose of property improvement.

In a case where the non-aqueous electrolyte solution of the present invention contains such another solvent, the content is preferably at most 30 vol %, more preferably at most 25 vol %, particularly preferably at most 20 vol %, based on 100 vol % of the total solvents to be used for the non-aqueous electrolyte solution.

As the solvent of the non-aqueous electrolyte solution of the present invention, the above mentioned solvents may be used alone or in combination depending upon the characteristics to be required, and the following solvents (i) to (iii) are preferred.

(i) A solvent composed only of the above carbonate type solvent.

(ii) A solvent composed of from 99 to 70 vol % of the above carbonate type solvent and from 1 to 30 vol % of the above hydrofluoroether.

(iii) A solvent composed of from 30 to 70 vol % of the above hydrofluoroether, from 0 to 30 vol % of the above carbonate type solvent, and from 1 to 30 vol % of the above ether compound.

The solvent (i) is excellent in lithium ion conductivity. The solvent (ii) is excellent in cycle characteristics. The solvent (iii) is excellent in safety.

[Other Components]

Further, in addition to the lithium salts and the solvent, the non-aqueous electrolyte solution of the present invention may contain, as the case requires, other components to improve the functions of the electrolyte solution. Such other components include, for example, a conventional overcharge-preventing agent, a dehydrating agent, a deoxidizing agent, and a property-improving additive to improve the cycle characteristics and the capacity-maintaining property after storage at high temperature.

The overcharge-preventing agent may, for example, be an aromatic compound such as biphenyl, an alkyl biphenyl, terphenyl, a partially hydrogenated terphenyl, cyclohexylbenzene, t-butylbenzene, t-amylbenzene, diphenyl ether or dibenzofuran; a partially fluorinated product of the above aromatic compound, such as 2-fluorobiphenyl, o-cyclohexylfluorobenzene or p-cyclohexylfluorobenzene; or a fluorinated anisole compound such as 2,4-difluoroanisole, 2,5-difluoroanisole or 2,6-difluoroanisole. One of such overcharge-preventing agents may be used alone, or two or more of them may be used in combination.

In the case where the non-aqueous electrolyte solution contains an overcharge-preventing agent, the content of the overcharge-preventing agent in the non-aqueous electrolyte solution of the present invention (100 wt %) is preferably from 0.1 to 5 wt %. When the content of the overcharge-preventing agent in the non-aqueous electrolyte solution is at least 0.1 wt %, it is easy to prevent rapture or ignition by overcharge of the secondary battery having the non-aqueous electrolyte solution of the present invention, and it is possible to use the secondary battery more stably.

The dehydrating agent may, for example, be molecular sieves, sodium sulfate, magnesium sulfate, calcium hydride, sodium hydride, potassium hydride or lithium aluminum hydride. As the solvent to be used for the non-aqueous electrolyte solution of the present invention, it is preferred to use one which has been dehydrated by means of the above dehydrating agent, followed by rectification. Otherwise, the solvent which has been dehydrated by means of the above dehydrating agent, without carrying out rectification, may also be used.

The property-improving additive may, for example, be a carboxylic acid anhydride such as succinic anhydride, glutaric anhydride, maleic anhydride, citraconic anhydride, glutaconic anhydride, itaconic anhydride, diglycolic anhydride, cyclohexanedicarboxylic acid anhydride, cyclopentanetetracarboxylic acid dianhydride or phenylsuccinic anhydride; a sulfur-containing compound such as ethylene sulfite, busulfan, sulfolane, sulfolene, dimethyl sulfone, diphenyl sulfone, methylphenyl sulfone, dibutyl disulfide, dicyclohexyl disulfide, tetramethylthiuram monosulfide, N,N-dimethylmethanesulfonamide or N,N-diethylmethanesulfonamide; a nitrogen-containing compound such as 1-methyl-2-pyrrolidinone, 1-methyl-2-piperidone, 3-methyl-2-oxazolidinone, 1,3-dimethyl-2-imidazolidinone or N-methylsuccinimide; a hydrocarbon such as heptane, octane or cycloheptane; or a fluorinated aromatic compound such as fluorobenzene, difluorobenzene, hexafluorobenzene or benzotrifluoride. One of these property-improving additives may be used alone, or two or more of them may be used in combination.

In the case where the non-aqueous electrolyte solution of the present invention contains the property-improving additive, the content of the property-improving additive in the non-aqueous electrolyte solution (100 wt %) is preferably from 0.1 to 5 wt %.

The non-aqueous electrolyte solution of the present invention preferably has a conductivity of at least $0.70$ $S \cdot m^{-1}$ at 25° C. with a view to practical use of secondary batteries having a non-aqueous electrolyte solution. The conductivity of the non-aqueous electrolyte solution may be measured by a method described in "Molten Salt and High-Temperature Chemistry, 2002, Vol. 45, pages 42 to 60".

Further, the viscosity (20° C.) of the non-aqueous electrolyte solution measured by a rotary viscometer is preferably from 0.1 to 20 cP.

The non-aqueous electrolyte solution of the present invention is preferably an electrolyte solution, of which the potential range (potential window) where the electrolytic current value reaches $0.05$ $mA/cm^2$ is a range wider than a range of from 0.2 V to 4.2 V. The value for such a potential window is a value represented by the potential based on the lithium metal. The measurement of the potential window can be carried out by the method which will be described in Examples.

By using the non-aqueous electrolyte solution of the present invention containing a small amount of the lithium salt (a1) as a electrolyte salt, it is possible to obtain a secondary battery having both high conductivity and stability free from thermal runaway by a drastic heat generation in the vicinity of a positive electrode.

<Secondary Battery>

The secondary battery using the non-aqueous electrolyte solution of the present invention is preferably a lithium-ion secondary battery having a negative electrode and a positive electrode, and the non-aqueous electrolyte solution of the present invention. In addition to the lithium-ion secondary battery, the non-aqueous electrolyte solution of the present invention may be used also for secondary batteries such as a lithium metal secondary battery, a lithium-ion secondary battery and a lithium-air secondary battery, and primary batteries such as a lithium primary battery.

The negative electrode may be an electrode containing a negative electrode active material capable of electrochemically absorbing/desorbing lithium ions. As the negative electrode active material, a known negative electrode active material for lithium-ion secondary batteries may be used. For example, a carbon material such as graphite or amorphous carbon, a metal such as metal lithium or a lithium alloy, or a metal compound, capable of absorbing/desorbing lithium ions may be mentioned. One of these negative electrode active materials may be used alone, or two or more of them may be used in combination.

Among them, a carbon material is particularly preferred as the negative electrode active material. Further, as the carbon material, graphite or a carbon material having the surface of graphite covered with carbon which is amorphous as compared with the graphite, is particularly preferred. The lithium salt (a1) in the non-aqueous electrolyte solution of the present invention is, as described above, hardly reduced and decomposed even on a negative electrode using graphite, whereby an effect to suppress thermal runaway may be exhibited stably.

The graphite is preferably such that the value d (interlayer distance, hereinafter referred to simply as "the value d") of the lattice plane (002 plane) obtained by the X-ray diffraction by the method of the Japan Society for Promotion of Scientific Research is from 0.335 to 0.338 nm, more preferably from 0.335 to 0.337 nm. Further, the crystallite size (Lc) obtained by the X-ray diffraction by the method of the Japan Society for Promotion of Scientific Research is preferably at least 30 nm, more preferably at least 50 nm, further preferably at least 100 nm. The ash content of the graphite is preferably at most 1 wt %, more preferably at most 0.5 wt %, further preferably at most 0.1 wt %.

Further, the carbon material having the surface of graphite covered with amorphous carbon is preferably such that graphite having a value d of from 0.335 to 0.338 nm is used as a nucleus, and the surface of the graphite is covered with amorphous carbon having a value d larger than the graphite, and the ratio of the graphite (mass: $W_A$) as the nucleus to the amorphous carbon (mass: $W_B$) covering the graphite is preferably from 80/20 to 99/1 by mass ratio ($W_A/W_B$). By using such a carbon material, it becomes easy to produce a negative electrode which has a high capacity and is hardly reactive with the electrolyte solution.

The particle size of the carbon material is preferably at least 1 µm, more preferably at least 3 µm, further preferably at least 5 µm, particularly preferably at least 7 µm, by a median diameter by a laser diffraction/scattering method. Further, the particle size of the carbon material is preferably at most 100 µm, more preferably at most 50 µm, further preferably at most 40 µm, particularly preferably at most 30 µm.

The specific surface area of the carbon material by BET method is preferably at least $0.3$ $m^2/g$, more preferably at least $0.5$ $m^2/g$, further preferably at least $0.7$ $m^2/g$, particularly preferably at least $0.8$ $m^2/g$. The specific surface area of the carbon material is preferably at most $25.0$ $m^2/g$, more preferably at most $20.0$ $m^2/g$, further preferably at most $15.0$ $m^2/g$, particularly preferably at most $10.0$ $m^2/g$.

The carbon material preferably has a value R ($=I_B/I_A$) of from 0.01 to 0.7, which is represented by a ratio of the peak intensity $I_B$ of a peak $P_B$ within a range of from 1,300 to 1,400 cm$^{-1}$ to the peak intensity $I_A$ of a peak $P_A$ within a range of from 1,570 to 1,620 cm$^{-1}$ when the carbon material is analyzed by the Raman spectrum using an argon ion laser beam. Further, the half value width of the peak $P_A$ is preferably at most 26 cm$^{-1}$, particularly preferably at most 25 cm$^{-1}$.

The metal useful as a negative electrode active material other than metal lithium, may, for example, be Ag, Zn, Al, Ga, In, Si, Ti, Ge, Sn, Pb, P, Sb, Bi, Cu, Ni, Sr or Ba. Further, the lithium alloy may, for example, be an alloy of lithium with the above metal. Further, the metal compound may, for example, be an oxide of the above metal.

Among them, at least one metal selected from the group consisting of Si, Sn, Ge, Ti and Al, or a metal compound, metal oxide or a lithium alloy containing such a metal, is preferred. At least one metal selected from the group consisting of Si, Sn and Al, a metal compound or a lithium alloy containing such a metal, or lithium titanate is more preferred.

The metal capable of absorbing/desorbing lithium ions, or the metal compound or the lithium alloy containing such a metal, usually has a large capacity per unit mass, as compared with the carbon material represented by graphite, and thus, it is suitable for a secondary battery which is required to have a higher energy density.

The positive electrode may be an electrode containing a positive electrode active material which is capable of electrochemically absorbing/desorbing lithium ions.

As such a positive electrode active material, a known positive electrode active material for lithium-ion secondary batteries may be used. For example, a lithium-containing transition metal oxide such as lithium cobalt oxide, lithium nickel oxide or lithium manganese oxide, a lithium-containing transition metal composite oxide using at least one transition metal, a transition metal oxide, a transition metal sulfide, a metal oxide or an olivine type metal lithium salt may be mentioned.

The transition metal of the lithium-containing transition metal composite oxide is preferably, for example, V, Ti, Cr, Mn, Fe, Co, Ni or Cu, and such a lithium-containing transition metal composite oxide may, for example, be a lithium-cobalt composite oxide such as $LiCoO_2$, a lithium-nickel composite oxide such as $LiNiO_2$, a lithium-manganese composite oxide such as $LiMnO_2$, $LiMn_2O_4$ or $LiMnO_3$, and one having a part of transition metal atoms which are the main component of such a lithium transition metal composite oxide substituted by another metal such as Al, Ti, V, Cr, Mn, Fe, Co, Li, Ni, Cu, Zn, Mg, Ga, Zr, Si or Yb. As such one having a substitute metal, $LiMn_{0.5}Ni_{0.5}O_2$, $LiMn_{1.8}Al_{0.2}O_4$, $LiNi_{0.85}Co_{0.10}Al_{0.05}O_2$, $LiMn_{1.5}Ni_{0.5}O_4$, $LiNi_{1/3}Co_{1/3}Mn_{1/3}O_2$ or $LiMn_{1.8}Al_{0.2}O_4$ may be mentioned.

As the transition metal oxide, $TiO_2$, $MnO_2$, $MoO_3$, $V_2O_5$ or $V_6O_{13}$, as the transition metal sulfide, $TiS_2$, FeS or $MoS_2$, and as the metal oxide, $SnO_2$ or $SiO_2$, may, for example, be mentioned.

The olivine type metal lithium salt is a substance represented by $Li_LX_xY_yO_zF_g$ wherein X is Fe (II), Co (II), Mn (II), Ni (II), V (II) or Cu (II), Y is P or Si and L, x, y, z and g are numbers which satisfy $0 \leq L \leq 3$, $1 \leq x \leq 2$, $1 \leq y \leq 3$, $4 \leq z \leq 12$ and $0 \leq g \leq 1$, respectively, or a complex thereof. For example, $LiFePO_4$, $Li_3Fe_2(PO_4)_3$, $LiFeP_2O_7$, $LiMnPO_4$, $LiNiPO_4$, $LiCoPO_4$, $Li_2FePO_4F$, $Li_2MnPO_4F$, $Li_2NiPO_4F$, $Li_2CoPO_4F$, $Li_2FeSiO_4$, $Li_2MnSiO_4$, $Li_2NiSiO_4$ or $Li_2CoSiO_4$ may be mentioned.

One of these positive electrode active materials may be used alone, or two or more of them may be used in combination.

Further, such a positive electrode active material having on its surface attached substance having a composition different from the substance constituting the positive electrode active material as the main component may also be used. The surface-attached substance may, for example, be an oxide such as aluminum oxide, silicon oxide, titanium oxide, zirconium oxide, magnesium oxide, calcium oxide, boron oxide, antimony oxide or bismuth oxide; a sulfate such as lithium sulfate, sodium sulfate, potassium sulfate, magnesium sulfate, calcium sulfate or aluminum sulfate; or a carbonate such as lithium carbonate, calcium carbonate or magnesium carbonate.

With regard to the amount of the surface-attached substance, the lower limit of the mass based on the positive electrode active material is preferably 0.1 wt ppm, more preferably 1 wt ppm, further preferably 10 wt ppm. The upper limit is preferably 20 wt %, more preferably 10 wt %, further preferably 5 wt %. By the surface-attached substance, it is possible to suppress an oxidation reaction of the non-aqueous electrolyte solution at the surface of the positive electrode active material and thereby to improve the battery life.

As the positive electrode active material, a lithium-containing composite oxide having an $\alpha$-$NaCrO_2$ structure as a matrix, such as $LiCoO_2$, $LiNiO_2$ or $LiMnO_2$, or a lithium-containing composite oxide having a spinel type structure as a matrix, such as $LiMn_2O_4$, is preferred from such a viewpoint that the discharge voltage is high, and the electrochemical stability is high.

For the preparation of an electrode, a binder to bind the negative electrode active material or the positive electrode active material is used.

As such a binder to bind the negative electrode active material or the positive electrode active material, an optional binder may be used so long as it is a material stable against the electrolyte solution and the solvent to be used at the time of preparing the electrodes. The binder may, for example, be a fluororesin such as polyvinylidene fluoride or polytetrafluoroethylene, a polyolefin such as polyethylene or polypropylene, a polymer or copolymer having unsaturated bonds such as a styrene/butadiene rubber, isoprene rubber or butadiene rubber, or an acrylic acid type polymer or copolymer such as an acrylic acid copolymer or a methacrylic acid copolymer. One of these binders may be used alone, or two or more of them may be used in combination.

In order to increase the mechanical strength and electrical conductivity, a thickener, an electrically conductive material, a filler or the like may be incorporated in the electrode.

The thickener may, for example, be carboxymethylcellulose, methylcellulose, hydroxymethylcellulose, ethylcellulose, polyvinyl alcohol, oxidized starch, phosphorylated starch, casein or polyvinylpyrrolidone. One of these thickeners may be used alone, or two or more of them may be used in combination.

The electrically conductive material may, for example, be a metal material such as copper or nickel, or a carbon material such as graphite or carbon black. One of these electrically conductive materials may be used alone, or two or more of them may be used in combination.

An electrode can be prepared by adding a binder, a thickener, an electrically conductive material, a solvent, etc. to a negative electrode active material or a positive electrode active material, to form a slurry, which is then applied to a current collector, followed by drying. In such a case, the electrode is preferably pressed and densified by pressing after the drying.

If the density of the positive electrode active material layer is too low, the capacity of the secondary battery is likely to be inadequate.

As the current collector, various type of current collector may be used. However, usually a metal or an alloy is employed. As a current collector for a negative electrode, copper, nickel, stainless steel or the like may be mentioned, and copper is preferred. Whereas, as a current collector for a positive electrode, a metal such as aluminum, titanium or tantalum, or its alloy may be mentioned, and aluminum or its alloy is preferred, and aluminum is particularly preferred.

The shape of the secondary battery may be selected depending upon the particular application, and it may be a coin-form, a cylindrical form, a square form or a laminate-form. Further, the shapes of the positive electrode and the negative electrode may also be suitably selected to meet with the shape of the secondary battery.

The charging voltage of the secondary battery is preferably set to be at least 3.4 V, particularly preferably at least 4.0 V, particularly preferably at least 4.2 V. In a case where the positive electrode active material of the secondary battery is a lithium-containing transition metal oxide, a lithium-containing transition metal composite oxide, a transition metal oxide, a transition metal sulfide or a metal oxide, the charging voltage is preferably at least 4.0 V, particularly preferably 4.2 V. Further, in a case where the positive electrode active material is an olivine type metal lithium salt, the charging voltage is preferably 3.2 V, particularly preferably at least 3.4 V. The non-aqueous electrolyte solution of the present invention has oxidation resistance of at least 4.2 V and reduction resistance of at most 0.2 V, and thus it may be used for any electrodes having an operating potential within such a range.

Further, the secondary battery is particularly preferably a secondary battery which is used at a charging voltage of at least 4.2 V (the potential based on lithium metal). For example, it may be a secondary battery having the non-aqueous electrolyte solution of the present invention which has a potential window wider than the range of from 0 V to 4.2 V.

Between the positive electrode and the negative electrode of the secondary battery, a porous film is usually interposed as a separator in order to prevent short circuiting. In such a case, the non-aqueous electrolyte solution with which the porous film is impregnated is used. The material and the shape of the porous film are not particularly limited so long as it is stable against the non-aqueous electrolyte solution and is excellent in the liquid-maintaining property. The porous film is preferably a porous sheet or a nonwoven fabric made of a fluororesin such as polyvinylidene fluoride, polytetrafluoroethylene or a copolymer of ethylene and tetrafluoroethylene, or a polyolefin such as polyethylene or polypropylene, and as the material, a polyolefin such as polyethylene or polypropylene is preferred. Further, such a porous film impregnated with the non-aqueous electrolyte solution of the present invention and gelated may be used as a gel electrolyte.

The material for a battery exterior package to be used for the secondary battery may be a material which is commonly used for secondary batteries, and nickel-plated iron, stainless steel, aluminum or its alloy, nickel, titanium, a resin material, or a film material may, for example, be mentioned.

The secondary battery having the non-aqueous electrolyte solution of the present invention as described above has a high conductivity and is capable of suppressing thermal runaway by a drastic heat generation in the vicinity of the positive electrode. Thus, the secondary battery may be used for various applications to, for example, mobile phones, portable game devices, digital cameras, digital video cameras, electric tools, notebook computers, portable information terminals, portable music players, electric vehicles, hybrid automobiles, electric trains, aircrafts, artificial satellites, submarines, ships, uninterruptible power supply systems, robots, electric power storage systems, and so on.

EXAMPLES

Now, the present invention will be described in detail with reference to working Examples and Comparative Examples. However, it should be understood that the present invention is by no means restricted to these examples.

<Preparation of Electrolyte Solution>

Preparation Example 1

Ethylene carbonate and ethyl methyl carbonate were mixed in a volume ratio of 1:1 to prepare solvent 1. In the solvent 1, $LiPF_6$ (inorganic lithium salt (a2)) was dissolved so that the concentration became 1 M to prepare electrolyte solution 1.

Preparation Example 2

In the electrolyte solution 1 prepared in Preparation Example 1, the following lithium salt (a1-1) (lithium salt (a1)) was dissolved so that the concentration became 28 mM based on the total amount of the electrolyte solution 1 to prepare electrolyte solution 2. The content of the lithium salt (a1-1) in the electrolyte solution 2 based on the total i.e. 100 mol % of $LiPF_6$ and the lithium salt (a1-1) was 2.8 mol %.

(a1-1)

Preparation Example 3

In the electrolyte solution 1 prepared in Preparation Example 1, the lithium salt (a1-1) was dissolved so that the concentration became 142 mM based on the total amount of the electrolyte solution 1 to prepare electrolyte solution 3. The proportion of the lithium salt (a1-1) in the electrolyte solution 3 based on the total i.e. 100 mol % of $LiPF_6$ and the lithium salt (a1-1) was 12.5 mol %.

Preparation Example 4

In the same solvent 1 as in Preparation Example 1, 0.8 M of $LiPF_6$ and 0.2 M of the lithium salt (a1-1) were dissolved to prepare electrolyte solution 4. The proportion of the lithium salt (a1-1) in the electrolyte solution 4 based on the total i.e. 100 mol % of $LiPF_6$ and the lithium salt (a1-1) was 20.0 mol %.

Preparation Example 5

In the same solvent 1 as in Preparation Example 1, 0.7 M of $LiPF_6$ and 0.3 M of the lithium salt (a1-1) were dissolved to prepare electrolyte solution 5. The proportion of the lithium salt (a1-1) in the electrolyte solution 5 based on the total i.e. 100 mol % of $LiPF_6$ and the lithium salt (a1-1) was 30.0 mol %.

Preparation Example 6

In the same solvent 1 as in Preparation Example 1, 0.5 M of $LiPF_6$ and 0.5 M of the lithium salt (a1-1) were dissolved to prepare electrolyte solution 6. The proportion of the lithium salt (a1-1) in the electrolyte solution 6 based on the total i.e. 100 mol % of $LiPF_6$ and the lithium salt (a1-1) was 50.0 mol %.

<Preparation of Sheet-Form Lithium-Ion Secondary Battery with Single-Pole Cell Comprising $LiCoO_2$ Positive Electrode-Lithium Metal Foil>

Preparation Example 7

90 Parts by mass of $LiCoO_2$ (tradename: "Selion C" manufactured by AGC Seimi Chemical Co., Ltd.), 5 parts by mass of carbon black (tradename: "DENKABLACK" manufactured by Denki Kagaku Kogyo Kabushiki Kaisha) and 5 parts by mass of polyvinylidene fluoride were mixed, and N-methyl-2-pyrrolidone was added thereto to obtain a slurry. The slurry was uniformly applied and dried on one side of an aluminum foil having a thickness of 20 μm, followed by pressing so that the positive electrode active material layer had a density of 3.0 $g/cm^3$, thereby to prepare a $LiCoO_2$ positive electrode.

Then, the above $LiCoO_2$ positive electrode, a lithium metal foil having the area equivalent to the $LiCoO_2$ positive electrode and a separator made of polyethylene were laminated in the order of the lithium metal foil, the separator and the $LiCoO_2$ positive electrode to prepare a battery element. Then, in a bag made of a laminate film having each side of aluminum (thickness: 40 μm) covered by a resin layer (polyethylene resin), the above battery element was accommodated so that terminals of the $LiCoO_2$ positive electrode and negative electrode (lithium metal foil) of the battery element extended out of the bag. Then, the electrolyte solution 1 prepared in Preparation Example 1 was injected into the bag, followed by vacuum sealing to prepare a sheet-form secondary battery 1 (secondary battery 1).

<Observation Test of Exothermic Behavior of Electrolyte Solution on Overcharged Positive Electrode by DSC Analysis>

Example 1

With the secondary battery 1 prepared in Preparation Example 7 in a state of being sandwiched by glass plates in order to increase adhesion between electrodes, a cycle of charging it to 4.2 V with a constant current corresponding to 0.1 C and then discharging it to 3 V with a constant current corresponding to 0.1 C is carried out at 25° C. for 5 cycles to stabilize the secondary battery. Then, the secondary battery 1 was charged to 4.5 V with a constant current corresponding to 0.1 C and was further charged with a constant voltage of 4.5 V until the current value became 0.01 C. Here, 1 C represents a current value to discharge the standard capacity of a battery at 4.2 V in one hour, and 0.1 C represents a current value of 1/10 thereof.

Figure 1:
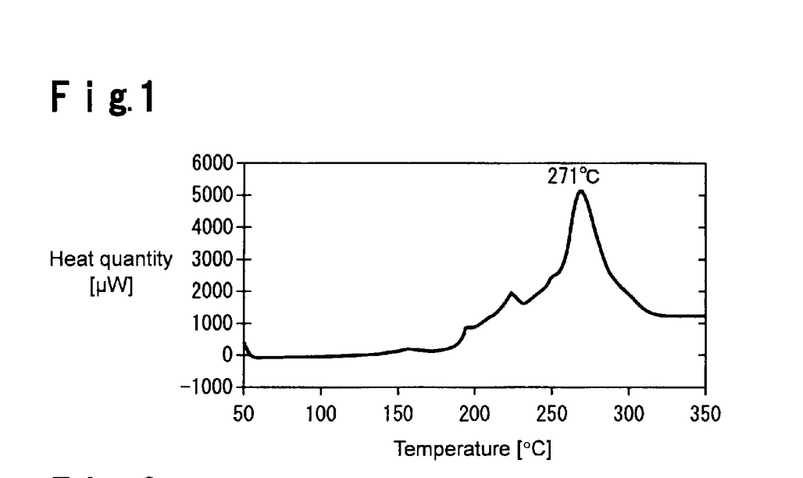
FIG. 1 is a chart showing measurement result of thermal behavior of the electrolyte solution in Example 1.

Then, the secondary battery 1 overcharged to 4.5 V was dissected in a glove box with an argon atmosphere, and the $LiCoO_2$ positive electrode was removed from the secondary battery 1 and was washed with ethyl methyl carbonate, followed by vacuum drying for 30 minutes. The dried overcharged positive electrode was punched out to obtain a round-shaped sample positive electrode having a diameter of 3 mm. The sample positive electrode was put on a 15-μL closed DSC pan made of SUS (stainless steel), of 5 μL of the electrolyte solution 3 prepared in Preparation Example 3 in drop form were put on the sample positive electrode, and the holder was sealed. Then, by means of DSC 6000 (model name) manufactured by Seiko Instruments Inc., thermal analysis of the electrolyte solution 3 on the sample positive electrode was carried out at a temperature rising rate of 5° C./min within a temperature range of from 50° C. to 350° C. The result is shown in FIG. 1.

Comparative Example 1

Figure 2:
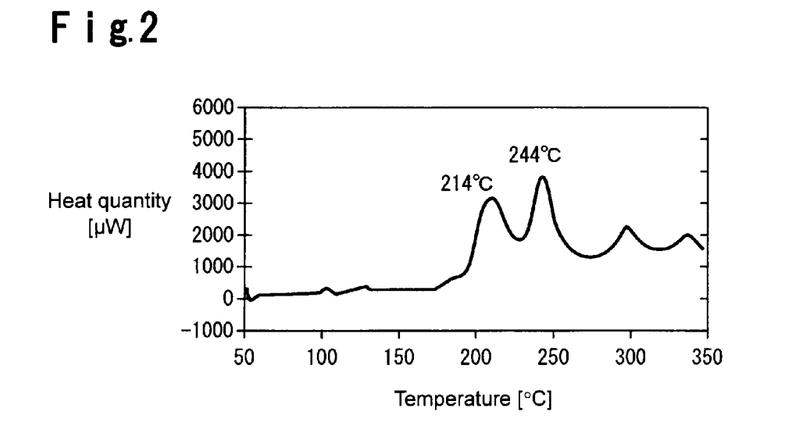
FIG. 2 is a chart showing measurement result of thermal behavior of the electrolyte solution in Comparative Example 1.

Thermal analysis was carried out in the same manner as in Example 1 except that the electrolyte solution to be put in drop form on the sample positive electrode was changed from the electrolyte solution 3 to the electrolyte solution 1. The result is shown in FIG. 2.

Comparative Example 2

Thermal analysis was carried out in the same manner as in Example 1 except that the electrolyte solution to be put in drop form on the sample positive electrode was changed from the electrolyte solution 3 to the electrolyte solution 2. The result is shown in FIG. 3.

As shown in FIG. 1, it was found that with regard to the secondary battery using the electrolyte solution of the present invention, the temperature which leads to thermal runaway at the positive electrode side is very high and that such a secondary battery may be used stably.

Figure 3:
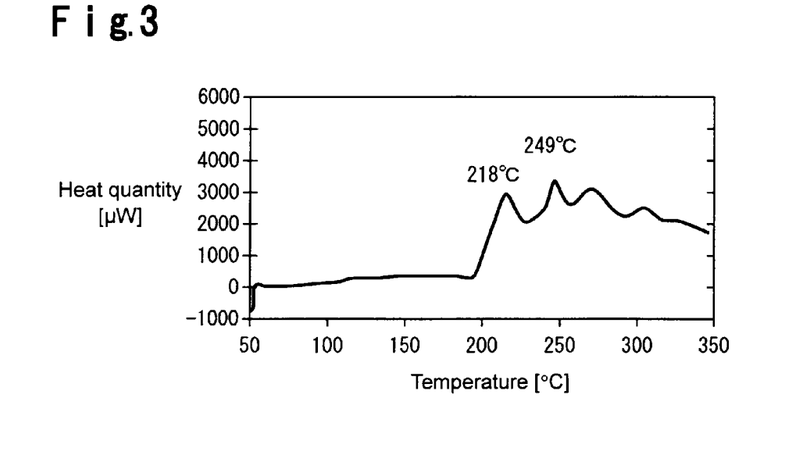
FIG. 3 is a chart showing measurement result of thermal behavior of the electrolyte solution in Comparative Example 2.

On the other hand, as shown in FIGS. 2 and 3, in the Comparative Examples of the present invention, it was found that in a case where an electrolyte solution containing no lithium salt (a1) is used or in a case where an electrolyte solution wherein the content of the lithium salt (a1) based on the total amount of the lithium salt (a1) and the inorganic lithium salt (a2) is less than 5 mol % is used, a large exothermic peak was observed at a lower temperature in the thermal analysis, and a lower temperature may lead to thermal runaway as compared with the secondary battery using the electrolyte solution of the present invention.

<Evaluation of Conductivity>

Example 2

With regard to the electrolyte solution 3 prepared in Preparation Example 3, the conductivity was measured by the method described in "Molten Salt and High-Temperature Chemistry, 2002, Vol. 45, pages 42 to 60". The measurement temperature was set to be 25° C.

Example 3

With regard to the electrolyte solution 4 prepared in Preparation Example 4, the conductivity was measured by the same method as in Example 2.

Comparative Examples 3 and 4

With regard to each of the electrolyte solution 5 prepared in Preparation Example 5 and the electrolyte solution 6 prepared in Preparation Example 6, the conductivity was measured by the same method as in Example 2.

The conductivity measurement results in Examples 2 and 3 and Comparative Examples 3 and 4 are shown in Table 1. In Table 1, the content of the lithium salt (a1) is the proportion of the lithium salt (a1-1) based on the total i.e. 100 mol % of $LiPF_6$ and the lithium salt (a1-1).

TABLE 1

| | Electrolyte solution | | |
|---|---|---|---|
| | Type | Content of lithium salt (a1) [mol %] | Conductivity [S/m] |
| Ex. 2 | Electrolyte solution 3 | 12.5 | 0.77 |
| Ex. 3 | Electrolyte solution 4 | 20.0 | 0.70 |
| Comp. Ex. 3 | Electrolyte solution 5 | 30.0 | 0.67 |
| Comp. Ex. 4 | Electrolyte solution 6 | 50.0 | 0.61 |

As shown in Table 1, in the working Examples of the present invention, a high conductivity was maintained.

On the other hand, in the Comparative Examples of the present invention, the conductivity was low, and the electrolyte solutions were not suitable for practical use.

As described above, the non-aqueous electrolyte solution of the present invention uses a lithium salt comprising a small amount of the lithium salt (a1) and the lithium salt (a2) which is the main electrolyte, whereby both stability free from thermal runaway in the vicinity of the positive electrode and high conductivity may be obtained.

INDUSTRIAL APPLICABILITY

The non-aqueous electrolyte solution for secondary batteries of the present invention is useful as an electrolyte solution containing no water to be used for secondary batteries such as lithium-ion secondary batteries.

This application is a continuation of PCT Application No. PCT/JP2010/066089 filed on Sep. 16, 2010, which is based upon and claims the benefit of priority from Japanese Patent Application No. 2009-217943 filed on Sep. 18, 2009. The contents of those applications are incorporated herein by reference in its entirety.

What is claimed is:

1. A non-aqueous electrolyte solution for secondary batteries, which comprises a lithium salt (a1) represented by formula (a1), an inorganic lithium salt (a2), and a solvent,
   wherein the proportion of the lithium salt (a1) based on the total amount of the lithium salt (a1) and the inorganic lithium salt (a2) is from 5.0 to 20.0 mol %:

$$R^1-CHF-SO_2-N(Li)-SO_2-CHF-R^2 \quad (a1),$$

and
   wherein in the formula (a1), each of $R^1$ and $R^2$ which are independent of each other, is a fluorinated $C_{1-5}$ alkyl group which may contain an ethereal oxygen atom, or a fluorine atom.

2. The non-aqueous electrolyte solution for secondary batteries according to claim 1, wherein the lithium salt (a1) comprises a compound represented by formula (a1-1):

$$CF_3-CHF-SO_2-N(Li)-SO_2-CHF-CF_3 \quad (a1-1).$$

3. The non-aqueous electrolyte solution for secondary batteries according to claim 1, wherein the inorganic lithium salt (a2) comprises at least one member selected from the group consisting of $LiPF_6$, $LiBF_4$, and $LiClO_4$.

4. The non-aqueous electrolyte solution for secondary batteries according to claim 1, wherein the inorganic lithium salt (a2) comprises $LiPF_6$.

5. The non-aqueous electrolyte solution for secondary batteries according to claim 1, which comprises a carbonate solvent.

6. The non-aqueous electrolyte solution for secondary batteries according to claim 1, wherein the total amount of the lithium salt (a1) and the inorganic lithium salt (a2) in the non-aqueous electrolyte solution is from 0.5 to 3.0 mol per 1 L of the whole solvent.

* * * * *